United States Patent [19]

Wade et al.

[11] Patent Number: 4,780,364
[45] Date of Patent: Oct. 25, 1988

[54] DECORATIVE PACKAGING FILMS

[75] Inventors: Kenneth Wade; Keith Pye, both of Bridgwater, United Kingdom

[73] Assignee: BCL Limited, Bridgwater, United Kingdom

[21] Appl. No.: 71,544

[22] Filed: Jul. 8, 1987

Related U.S. Application Data

[63] Continuation of Ser. No. 674,279, Nov. 23, 1984, abandoned.

[51] Int. Cl.$^4$ .............. B29C 47/06; B29C 55/12; B29B 7/88; B29B 15/10
[52] U.S. Cl. .................. 428/315.5; 264/134; 264/154; 264/171; 264/211; 264/288.8; 264/289.3; 264/290.2; 428/317.9; 428/910
[58] Field of Search .......... 428/315.5, 317.9, 910; 264/171, 211, 154, 134, 288.8, 289.3, 290.2

[56] References Cited

U.S. PATENT DOCUMENTS

| | | | |
|---|---|---|---|
| 3,737,354 | 6/1973 | Hattori | 156/229 |
| 3,900,670 | 8/1975 | Ikeda et al. | 428/308 |
| 4,058,582 | 11/1977 | Bierenbaum et al. | 264/154 |
| 4,176,148 | 11/1979 | Magder et al. | 264/154 X |
| 4,255,376 | 3/1981 | Soehngen | 264/154 X |
| 4,632,869 | 12/1986 | Park et al. | 428/910 X |

FOREIGN PATENT DOCUMENTS

| | | | |
|---|---|---|---|
| 83495 | 7/1983 | European Pat. Off. | |
| 1364237 | 8/1974 | United Kingdom | 264/154 |
| 2060488 | 5/1981 | United Kingdom . | |
| 2097988 | 11/1982 | United Kingdom . | |

*Primary Examiner*—Philip Anderson
*Attorney, Agent, or Firm*—Watson, Cole, Grindle & Watson

[57] ABSTRACT

A decorative packaging film comprises a base film of a synthetic polymeric material (an olefinic polymer) containing a highly light absorbent pigment, for example carbon black, and at least one surface layer of a second synthetic polymeric material, which is light transmittable and which contains a solid particulate material, for example calcium carbonate, having a particle size of from 0.1 to 10 microns and present in an amount from 1 to 40% by weight, the combination having been stretched to cause the formation of voids in the surface layer or layers at the sites of the particles of the particulate material. The appearance of the film varies from an intense opalescence to a lustrous metallic appearance.

11 Claims, No Drawings

DECORATIVE PACKAGING FILMS

This application is a continuation of application Ser. No. 674,279 filed Nov. 23, 1984, now abandoned.

BACKGROUND OF THE INVENTION

This invention is concerned with decorative packaging film and, in particular, with a packaging film having a lustrous appearance.

It is well known to manufacture a packaging film having an opalescent pearl-like appearance by forming in the body of the film a large number of microscopic voids. This is achieved, for example in polypropylene film, by incorporating within the film a dispersion of inert particulate material, for example, particulate calcium carbonate having a particle size of about 3 microns, and then stretching the film in one or in two directions at right angles to each other at a temperature below its second order transition temperature when voids are formed at the site of each particle. Such films have wide application in the packaging field, particularly in the packaging of food-stuffs.

SUMMARY OF THE INVENTION

According to the present invention, a method for the manufacture of a decorative packaging film comprises forming a base film of a synthetic polymeric material incorporating a highly light-absorbent pigment, applying to at least one surface of the base layer a surface layer of a second synthetic polymeric material which is light transmittable and in which is dispersed from 1 to 40% by weight of a solid particulate material having a particle size of from 0.1 to 10 microns, and stretching the combination of the base layer and surface layer or layers in one or more directions so as to form voids in the surface layer or layers at the sites of the particles of the particulate material.

The packaging film so produced by the method of the present invention has an attractive lustrous appearance when viewed through a surface layer.

By selection of the thickness of the surface layer, the particle size of the particulate material, and the concentration of the particulate material in the layer, the appearance of the surface layer may be varied from an intense opalescence to a very distinctive lustrous metallic sheen. Further, the film will have a particular colouration depending upon the pigment incorporated in the base layer.

The base film may be any of the well known synthetic polymeric mateials used for packaging films such as low, medium or high density polyethylene, linear low density polyethylene, polypropylene, a copolymer or terpolymer selected from the monomers ethylene, propylene or butene-1, a polyester such as polyethylene terephthalate and polyvinyl chloride which prior to formation into a film by melt extrusion through a film forming die has been pigmented either by dispersing a particulate pigment in the polymeric material or by incorporating a dyestuff.

The pigment must be in such quantity and of such a nature that a major proportion of the light transmitted by a surface layer is absorbed. A particulate pigment should be suspended in the polymeric material of the base film in an amount not less than 0.1% or exceeding 40% by weight. A preferred hue for the pigment is black, preferably carbon black in an amount not exceeding about 10% by weight.

Other pigments having, for example, deep red or blue hues may usefully be employed in the practice of the invention to give different coloured and in particular, metallic effects to the product.

The second synthetic polymeric material applied as a surface layer to one or both surfaces of the base layer may be the same as or different from the synthetic material forming the base layer. It, too, may be a low, medium or high density polyethylene, a linear low density polyethylene, polypropylene, a copolymer or terpolymer selected from the monomers ethylene, propylene and butene-1, a polyester such as polyethylene terephthalate or polyvinyl chloride.

The propylene/ethylene copolymer having two to six per cent ethylene by weight as described in British Patent Specification No. 1145197 or the linear random copolymer of ethylene and up to 12 mole per cent of an alpha olefin such as propylene or butene-1 as described in British Patent Specification No. 1440311 are particularly useful as a base film or a surface layer. Also, useful as a base film or a surface layer is a terpolymer of propylene, butene-1 and ethylene which is commercially available in the proportion by units by weight of 86.3% polypropylene, 12.0% butene-1 and 1.7% ethylene.

The solid particulate material may be of any of the materials commonly used in the production of the known opalescent pearl-like ("pearlised") films, that is, any mineral, for example talc, Woolastonite, mica, silica, titanium dioxide and most preferably in the present invention, calcium carbonate, or natural filler such as wood flour or a synthetic polymer having a melting point above the extrusion temperature of the second synthetic polymeric material such as a polyamide or a polyester. The particulate material preferably has an average size in the range from 1 to 5 microns and is present in the second synthetic polymeric material to an extent of from 2 to 20% by weight. The particulate material is conveniently introduced into the second synthetic material and intimately dispersed therein during batch mixing operations.

The surface layer or layers may be applied to one or both sides of the base layer by lamination, by melt extrusion or, more conveniently, by co-extrusion.

If required, a transparent heat-sealable composition layer may be applied to one or both surfaces of the base layer/surface layer or layers combination to render the decorative packaging film heat-sealable and to increase the surface gloss. Such heat-sealable layer may be of any of the usual heat-sealing compositions, namely polyethylene, a copolymer of propylene with a minor proportion of ethylene, a linear copolymer of ethylene with a minor proportion of propylene or butene-1 or a terpolymer of propylene, ethylene and butene-1, and is conveniently applied to the base film/surface layer or layers combination by melt extrusion or by co-extrusion.

The invention also includes a decorative packaging film when manufactured by a method in accordance with the invention.

Specific examples of the production of a decorative packaging film in accordance with the invention are now described.

EXAMPLE 1

A melt of an intimate blend of polypropylene granules and 3% by weight of carbon black sandwiched between two outer layers of a melt of polypropylene containing in dispersion 5% by weight of uniformly dispersed particles of calcium carbonate having an average particle size of about 3 microns was co-extruded through a slot die. The melt combination was immediately quenched and the resulting film was then heated to a temperature of 100° C. and stretched 4.5 times in the longitudinal direction. Immediately thereafter the film was led into a stenter, heated to a temperature of 160° C. and then stretched 10 times in the transverse direction. After heat-setting at a temperature of 150° C., the film was trimmed at the edges and wound into a roll. The thickness of the layers on co-extrusion were so chosen that in the final film product the centre layer was 23 microns thick and each outer surface layer was 6 microns thick. On examination it was found that the product had on both sides a lustrous metallic appearance which resembled aluminium metallised film.

EXAMPLE 2

The procedure of Example 1 was repeated except that the outer layers of the co-extruded melt consisted of a propylene/ethylene copolymer in which the ethylene content was 4% by weight and in which one of the layers only contained 10% by weight of carbon black. The centre layer consisted of polypropylene containing 2.5% by weight of particulate Calcium Carbonate in which the average particle size was 3 microns. The thickness of the layers on co-extrusion were so chosen that in the final film product the centre layer was 23 microns thick and each of the outer layers were 6 microns thick. When viewed from the side of the clear outer layer, the product had a glossy lustrous metallised appearance resembling aluminium and when viewed from the side of the outer layer containing the carbon black the product was a satin black. Further, the product was heat-sealable top-side to top-side and top-side to under-side.

EXAMPLE 3

The procedure of Example 2 was repeated except that the thicknesses of the layers on co-extrusion were so chosen that in the final product the centre layer was 35 microns thick and the outer layers were 2.5 microns thick and the centre layer contained 10% by weight of particulate calcium carbonate in which the average size of the particles was 3 microns. The product, when viewed from the side of the clear outer layer was a glossy intense lustrous white and when viewed from the side of the outer layer containing the carbon black was a satin black. The product was heat-sealable top-side to top side and top-side to under-side.

EXAMPLE 4

The procedure of Example 1 was repeated except that the thickness of the layers on co-extrusion were adjusted so that the thickness of the outer layers in the product were 4 microns thick whilst retaining the thickness of the centre layer at 23 microns and the outer layers contained 5% by weight of particulate calcium carbonate having an average particle size of 1.5 microns. The product had on both sides a lustrous metallic appearance which resembled aluminium.

We claim:

1. A method for the manufacture of a decorative packaging film which has a lustrous metallic appearance, said method comprising the steps of (1) forming a base layer of a synthetic polymeric material incorporating a highly light absorbent pigment, (2) applying to at least one surface of the base layer a surface layer of a second synthetic polymeric material which is light transmittable and in which is dispersed from 1 to 40% by weight of a solid particulate material having a particle size of from 0.1 to 10 microns, said solid particulate material comprising a mineral, a natural filler, or a polymer having a melting point above the extrusion temperature of said second synthetic polymeric material, (3) stretching the combination of the base layer and surface layer or layers in one or more directions at a temperature wherein said layers are extendable but not yet in the form of a melt so as to form voids in the surface layer or layers at the sites of the particles of the particulate material, and (4) allowing said stretched combination of base layer and surface layer or layers to cool, thus providing said decorative packaging film.

2. A method as claimed in claim 1, wherein the base film is low, medium or high density polyethylene, linear low density polyethylene, polypropylene, a copolymer or terpolymer selected from the monomers ethylene, propylene or butene-1, a polyester or polyvinyl chloride.

3. A method as claimed in claim 1, wherein the pigment is particulate and is present in the base layer in an amount of from 0.1% to about 40% by weight.

4. A method as claimed in claim 3, wherein the pigment is carbon black and is present in the base layer in an amount of from 0.1 to about 10% by weight.

5. A method as claimed in claim 1, wherein the second synthetic polymeric material is low, medium or high density polyethylene, linear low density polyethylene, polypropylene, a copolymer or terpolymer selected from the monomers ethylene, propylene or butene-1, a polyester or polyvinyl chloride.

6. A method as claimed in claim 1, wherein the solid particulate material is a mineral selected from the group consisting of silica, titanium dioxide and calcium carbonate.

7. A method as claimed in claim 1, wherein the solid particulate material has an average particle size in the range between 1 and 5 microns and is present in the second polymeric material from 2 to 20% by weight.

8. A method as claimed in claim 1, including the step of applying a transparent heat-sealable composition layer to one or both surfaces of the base layer/surface layer or layers combination.

9. A method as claimed in claim 1, wherein the step (2) each surface layer is applied to the base layer by melt extrusion or by co-extrusion.

10. A method as claimed in claim 9, where in step (2) each surface layer is applied to the base layer by co-extrusion, and wherein between steps (2) and (3) the co-extruded base layer and surface layer(s) are quenched and then heated to a temperature of at least 100° C.

11. A decorative film which has a lustrous metallic appearance and is manufactured by the steps of (1) forming a base layer of a synthetic polymeric material incorporating a highly light absorbent pigment, (2) applying to at least one surface of the base layer a surface layer of a second synthetic polymeric material which is light transmittable and in which is dispersed from 1 to 40% by weight of a solid particulate material having a particle size of from 0.1 to 10 microns, said solid particulate material comprising a mineral, a natural filler, or a polymer having a melting point above the extrusion temperature of said second synthetic polymeric material, (3) stretching the combination of the base layer and surface layer or layers in one or more directions at a temperature wherein said layers are pliable but not yet in the form of a melt so as to form voids in the surface layer or layers at the sites of the particles of the particulate material, and (4) allowing said stretched combination of base layer and surface layer or layers to cool, thus providing said decorative packaging film.

* * * * *

UNITED STATES PATENT AND TRADEMARK OFFICE
CERTIFICATE OF CORRECTION

PATENT NO. : 4,780,364
DATED : October 25, 1988
INVENTOR(S) : Kenneth Wade et al.

It is certified that error appears in the above-identified patent and that said Letters Patent is hereby corrected as shown below:

ON THE TITLE PAGE INSERT:

--[30] Foreign Application Priority Data

November 23, 1983   Great Britain .......... 833 1192 --.

Signed and Sealed this

Fourteenth Day of March, 1989

Attest:

DONALD J. QUIGG

*Attesting Officer*     *Commissioner of Patents and Trademarks*